(12) United States Patent
Shirakawa et al.

(10) Patent No.: US 7,355,932 B2
(45) Date of Patent: Apr. 8, 2008

(54) OPTICAL DISK DEVICE FOR DETECTING THICKNESS ERRORS OF THE TRANSPARENT SUBSTRATE

(75) Inventors: Hidekazu Shirakawa, Tokyo (JP); Ryuichi Katayama, Tokyo (JP)

(73) Assignee: NEC Corporation (JP)

( * ) Notice: Subject to any disclaimer, the term of this patent is extended or adjusted under 35 U.S.C. 154(b) by 579 days.

(21) Appl. No.: 10/077,639

(22) Filed: Feb. 15, 2002

(65) Prior Publication Data

US 2002/0114231 A1    Aug. 22, 2002

(30) Foreign Application Priority Data

Feb. 16, 2001    (JP) ............... 2001-039586

(51) Int. Cl.
*G11B 7/095* (2006.01)
(52) U.S. Cl. ............... 369/44.32; 369/44.23; 369/53.19
(58) Field of Classification Search ............ 369/53.23, 369/44.41, 44.32, 44.23, 53.19
See application file for complete search history.

(56) References Cited

U.S. PATENT DOCUMENTS

| | | | | | |
|---|---|---|---|---|---|
| 4,533,826 | A | * | 8/1985 | van Alem ................ | 250/201.5 |
| 4,974,220 | A | * | 11/1990 | Harada .................... | 369/44.26 |
| 5,136,566 | A | * | 8/1992 | Iwazaki ................... | 369/44.25 |
| 5,177,726 | A | * | 1/1993 | Terada .................... | 369/44.27 |
| 5,414,682 | A | * | 5/1995 | Iida ........................ | 369/44.25 |
| 5,677,903 | A | * | 10/1997 | Holtslag et al. ........ | 369/112.28 |
| 5,881,035 | A | * | 3/1999 | Ueyama .................. | 369/44.23 |
| 6,031,792 | A | * | 2/2000 | Nakano et al. .......... | 369/13.05 |
| 6,111,832 | A | * | 8/2000 | Tsuchiya et al. ........ | 369/53.23 |
| 6,243,341 | B1 | * | 6/2001 | Hasimoto ................ | 369/53.22 |
| 6,246,646 | B1 | * | 6/2001 | Abe et al. ............... | 369/44.27 |
| 6,339,570 | B1 | * | 1/2002 | Kikuchi et al. ......... | 369/53.1 |
| 6,353,582 | B1 | * | 3/2002 | Kikuchi .................. | 369/44.23 |
| 6,584,048 | B1 | * | 6/2003 | Tateishi et al. ......... | 369/44.28 |
| 6,628,582 | B2 | * | 9/2003 | Furukawa ............... | 369/44.32 |

FOREIGN PATENT DOCUMENTS

| | | |
|---|---|---|
| JP | 64-046240 | 2/1989 |
| JP | 01-184638 | 7/1989 |
| JP | 09-251645 | 9/1997 |
| JP | 11-259893 | 9/1999 |
| JP | 2000-011402 | 1/2000 |
| JP | 2000-20993 | 1/2000 |
| JP | 2000-020999 | 1/2000 |
| JP | 2000-057616 | 2/2000 |
| JP | 2000-076665 | 3/2000 |
| JP | 2000-155979 | 6/2000 |
| JP | 2000-171346 | 6/2000 |

* cited by examiner

*Primary Examiner*—Gautam R. Patel
(74) *Attorney, Agent, or Firm*—Hayes Soloway P.C.

(57) ABSTRACT

The invention detects the thickness error of the transparent substrate using a general focus error signal detection system employing the fact that the reflecting light from the optical disk causes distortions in diffraction image at the detection plane or unsymmetrical expansions before and after the detection plane due to spherical aberration as a result of thickness errors of the transparent substrate. The absolute amount of the thickness error of the transparent substrate and its symbol are detected by detecting the difference between the absolute value of the positive side peak and the absolute value of the negative side peak of the focus sum signal, or the difference in focus positions between the peak point of the focus sum signals and the zero point of the focus error signals using the focus error signal detection system according to the knife-edge method. This enables it to detect the thickness error of the transparent substrate without using a special optical system.

9 Claims, 9 Drawing Sheets

OPTICAL DISK DEVICE FOR DETECTING THICKNESS ERRORS OF THE TRANSPARENT SUBSTRATE

BACKGROUND OF THE INVENTION

1. Technical Field of the Invention

The present invention relates to an optical disk device for recording or reproducing information, in particular, to an optical disk device capable of detecting a thickness error of the transparent substrate of the optical disk.

2. Description of the Related Art

The optical disk device typically used in CD (compact disk) and DVD (digital versatile disk) devices as a means of recording or reproducing information using light is widely used as an information recording device for images, sound and computer data, and demand for increasing its density and capacity has constantly intensified in recent years. The recording density of an optical disk device can be effectively increased by reducing the spot diameters of optical beams condensed on the recording/reproducing surface by means of lowering the wavelength of the source light and increasing the numerical aperture (NA) of the objective lens mounted on the optical head that writes and reads information.

Furthermore, information recording or reproducing are normally carried out by irradiating the recording/reproducing surface with optical beams through a transparent substrate, which serves as the protective layer, so that spherical aberrations occur if the thickness of the transparent substrate deviates from the specified value and causes degradation in the recording/reproducing characteristics. Spherical aberrations due to a thickness error of the transparent substrate increases in proportion to the fourth power of the NA, which is tolerable if the NA is 0.45 through 0.6 as in the prior art in view of the fact that there is a thickness error resulting from the conventional disk forming process, but it becomes critical as the NA increases in order to achieve a higher density as mentioned before, so that it has become necessary to detect the thickness error of the transparent substrate and compensate for the spherical aberrations accordingly.

Examples of the prior art for detecting the thickness error of the transparent substrate have been proposed in Japanese Patent Publication No. 2000-11402 and Japanese Patent Publication No. 2000-20993, which disclose a method for detecting the thickness error of the transparent substrate based on the difference between the focus error signal detected from the light reflecting from the recording surface and the focus error signal detected from the light reflecting from the transparent substrate surface. This method uses an optical element that splits a light beam from a single light source into two light beams or two light beams from two light sources to cause these light beams to focus on the recording surface and the transparent substrate surface respectively. Also, Japanese Patent Publication No. 2000-20999 discloses a method for detecting the thickness error of the transparent substrate based on the light intensity distribution obtained by splitting the light beam reflected from the recording surface through the transparent substrate, spatially offsetting the two light beams, and then overlaying them one on top of the other.

However, since all of these prior art methods require special optical systems for detecting the thickness error, they all present a common problem in diminishing productivity and increasing manufacturing costs due to the larger number of parts and numbers of work hours required for system adjustments as well as problems of difficulty in designing smaller and lighter optical disk devices due to the need for special optical systems for detecting thickness errors.

SUMMARY OF THE INVENTION

The object of the present invention is to provide an optical disk device that achieves a stable high-density recording/reproduction by means of detecting thickness errors of the transparent substrate and to compensate for spherical aberrations despite an increase in the objective lens' NA without requiring any special optical system. Thus the chance of any substantial productivity declines or costs increasing, or increasing the size of the device is eliminated.

The optical disk device according to the present invention for recording or reproducing information on an optical disk in which a recording layers are formed on transparent substrates having: a condenser for condensing light for recording or reproducing information on a recording layer through a transparent substrate of the optical disk; a signal detector for detecting focus error signals and focus sum signals from the light reflecting from said recording layer; and a thickness error detector for detecting the thickness error of said transparent substrate with respect to the specified value based on the characteristics of said focus error signal.

Another optical disk according to this invention is equipped with: a condenser for condensing light for recording or reproducing information on a recording layer through a transparent substrate of the optical disk; a signal detector for detecting focus error signals and focus sum signals based on light reflecting from said recording layer; and a thickness error detector for detecting thickness errors of said transparent substrate with respect to the specified value based on the peak position of said focus sum signal.

The optical disk device of the present invention detects the thickness error of the transparent substrate using a signal detector based on conventional focus error signal detection methods, such as the knife-edge method, the spot size method, and the astigmatism method, without using any special detection optical system. Since the beam spread is unsymmetrical before and after the detection plane for detecting information light beams reflected from the recording/reproducing surface due to aspheric aberrations caused by deviations in the thickness of the transparent substrate from the specified value, focus error signals detected by the conventional focus error signal detection systems, such as the knife-edge method, the spot size method, and the astigmatism method, develop asymmetrical curves differing on the plus side and the minus side depending on the substrate thickness error amount. Moreover, since the light beams condensing on the detection plane themselves produce distorted diffraction images containing aspheric aberrations, the focus sum signal obtained by adding all the detection lights obtained in the conventional focus error signal detection system varies relative to the substrate thickness error, and its peak point generates a difference from said focus error signal's zero point (in-focus point). The invention detects the thickness error of the transparent substrate using the characteristics difference of the plus side and the minus side on curves of the focus error signal and the variation of the peak point of the focus sum signal corresponding to the substrate thickness error amount obtained in such a conventional focus error signal detection system. Therefore, it does not require a special optical system for detecting the thickness error of the transparent substrate so that an optical disk device is capable of high density recording or reproducing without causing any substantial productivity drop, cost increase, and/or increase in the size of the device.

In a construction example of the optical disk device according to the present invention, said signal detectors (1 through 6, 9, 10, 11, 13, 100) detect said focus error signal and said focus sum signal by means of the knife-edge method, and said thickness error detector (100) detects the thickness error of said transparent substrate or its symbol based on the difference between the absolute value of the positive peak and the absolute value of the negative peak of said focus error signal.

In another construction example of the optical disk device of the present invention, said signal detectors (1 through 6, 9, 10, 11, 13, 100) detect said focus error signal and said focus sum signal by means of the knife-edge method, and said thickness error detector (100) detects the thickness error of said transparent substrate or its symbol based on the difference between the peak point of said focus sum signal and the zero point of said focus error signal in their focus positions.

In another construction example of the optical disk device of the present invention, said signal detectors (20 through 25, 28 through 33, 100a) detect said focus error signal and said focus sum signal by means of the spot size method, and said thickness error detector (100a) detects the thickness error of said transparent substrate or its symbol based on the difference between the absolute value of the positive peak and the absolute value of the negative peak of said focus error signal.

In another construction example of the optical disk device of the present invention, said signal detectors (20 through 25, 28 through 33, 100a) detect said focus error signal and said focus sum signal by means of the spot size method, and said thickness error detector (100a) detects the thickness error of said transparent substrate or its symbol based on the difference between the peak point of said focus sum signal and the zero point of said focus error signal in their focus positions.

In another construction example of the optical disk device of the present invention, said signal detectors (42 through 47, 50 through 53, 100b) detect said focus error signal and said focus sum signal by means of the astigmatism method, and said thickness error detector (100b) detects the thickness error of said transparent substrate based on the focus pull-in range, which is the distance between the positive peak and the negative peak of said focus error signal.

In another construction example of the optical disk device of the present invention, said thickness error detector detects the absolute value of the thickness error of said transparent substrate based on said focus pull-in range, and detects the signal of the thickness error of said transparent substrate by comparing the waveform in the vicinity of the positive peak and the waveform in the vicinity of the negative peak of said focus error signal.

In another construction example of the optical disk device of the present invention, said signal detectors (42 through 47, 50 through 53, 100b) detect said focus error signal and said focus sum signal by means of the astigmatism method, and said thickness error detector detects the thickness error of said transparent substrate or its symbol based on the difference between the peak point of said focus sum signal and the zero point of said focus error signal in their focus positions.

Another construction example of the optical disk device of the present invention comprises aspheric aberration compensators (5, 24, 46) that compensate for aspheric aberration caused by the thickness error of said transparent substrate placed on the optical paths of said signal detectors.

Another construction example of the optical disk device of the present invention has controllers (100, 100a, 100b, 101, 101a, 101b) that calculate compensation factors for said aspheric aberrations for various radial positions of said optical disk based on the thickness errors of said transparent substrate detected in advance at various radial positions of said optical disk before recording or reproducing information, and cause said aspheric aberration compensators to correct said aspheric aberrations based on said compensation factors during the recording or reproducing operation of said optical disk.

According to the present invention, by providing thickness error detectors that detect the thickness errors of the transparent substrate based on the characteristics of the focus error signal or thickness error detectors that detect the thickness errors of the transparent substrate based on the peak position of the focus sum signal, it is possible to detect the thickness errors of the transparent substrate by means of signal detectors using the conventional focus error signal detection method such as the knife-edge method, the spot size method, and the astigmatism method without requiring any special detection optical system even in a case where it is necessary to detect and compensate for the thickness error of the transparent substrate due to an increase in the NA of the objective lens for high density recording and reproduction. Consequently, it is possible to realize an optical disk device capable of stable, high-density recording/reproduction without causing any substantial diminishing productivity, cost increase or increases in the size of the device.

It is also possible to detect the absolute value of the thickness error of the transparent substrate from the absolute amount of the difference between the absolute value of the positive peak and the absolute value of the negative peak of the focus error signal, and also detect the signal of the thickness error from the signal of said difference, by means of providing a thickness error detector that detects the thickness error of the transparent substrate based on the difference between the absolute value of the positive peak and the absolute value of the negative peak of the focus error signal obtained by using the signal detectors based on the knife-edge method.

It is also possible to detect the absolute value of the thickness error of the transparent substrate from the absolute amount of the difference in the focus positions, and also detect the signal of the thickness error from the signal of said difference, by means of providing a thickness error detector that detects the thickness error of the transparent substrate based on the difference between the peak point of the focus sum signal and the zero point of the focus error signal in their focus positions obtained by using the signal detectors based on the knife-edge method.

It is also possible to detect the absolute value of the thickness error of the transparent substrate from the absolute amount of the difference between the absolute value of the positive peak and the absolute value of the negative peak of the focus error signal, and also detect the signal of the thickness error from the signal of said difference, by means of providing a thickness error detector that detects the thickness error of the transparent substrate based on the difference between the absolute value of the positive peak and the absolute value of the negative peak of the focus error signal obtained by using the signal detectors based on the spot size method.

It is also possible to detect the absolute value of the thickness error of the transparent substrate from the absolute value of the difference in the focus positions, and also detect the signal of the thickness error from the signal of said difference, by means of providing a thickness error detector that detects the thickness error of the transparent substrate based on the difference between the peak point of the focus sum signal and the zero point of the focus error signal in their focus positions obtained by using the signal detectors based on the spot size method.

It is also possible to detect the absolute amount of the thickness error of the transparent substrate by means of providing a thickness error detector that detects the thickness error of the transparent substrate based on the focus pull-in range, which is the distance between the positive peak and the negative peak of said focus error signal obtained by using the signal detectors based on the astigmatism method.

It is also possible to detect the sign of the thickness error of the transparent substrate by means of comparing the waveform in the vicinity of the positive peak and the waveform in the vicinity of the negative peak of said focus error signal.

It is also possible to detect the absolute amount of the thickness error of the transparent substrate from the absolute amount of the difference in the focus positions, and also detect the sign of the thickness error from the sign of said difference, by means of providing a thickness error detector that detects the thickness error of the transparent substrate based on the difference between the peak point of the focus sum signal and the zero point of the focus error signal in their focus positions obtained by using the signal detectors based on the astigmatism method.

It is also possible to compensate for the aspheric aberration caused by the thickness error of the transparent substrate based on the detected thickness error, by placing aspheric aberration compensators on the optical paths of the signal detectors.

It is also possible to compensate for aspheric aberration in order to provide stable, high-density recording and reproduction even if the thickness of the transparent substrate varies with the radial position, by providing a controller that calculates compensation factors for said aspheric aberrations for various radial positions of the optical disk based on the thickness errors of said transparent substrate detected in advance at various radial positions of the optical disk before recording or reproducing information, and cause said aspheric aberration compensators to compensate for said aspheric aberrations based on said compensation factors during the recording or reproducing operation of the optical disk.

THE DETAILED DESCRIPTION OF THE PREFERRED EMBODIMENTS

Figure 1:
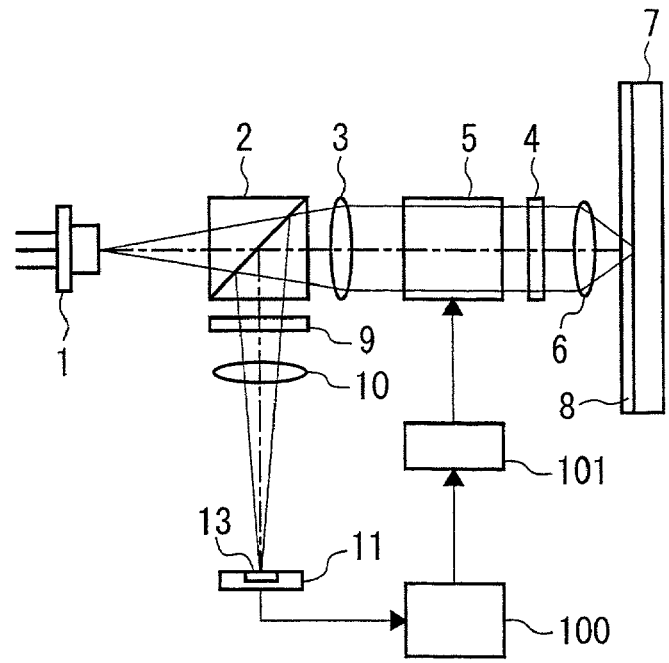
FIG. 1 is a block diagram showing the construction of the optical disk device according to the first embodiment of the present invention.

Embodiments of the present invention will be described below in detail with reference to the accompanying drawings. FIG. 1 shows the first embodiment of the present invention. FIG. 1 shows an optical disk device for recording/reproducing information on an optical disk with a recording layer formed on a transparent substrate, having a typical construction for detecting focus error signals that detect the deviations of condensing points of light beams condensing on the recording/reproducing surface by means of the knife-edge method. The principle of detecting the thickness error of the transparent substrate in the optical disk device as shown in FIG. 1 using the focus error signal detection system of the knife-edge method will be described below.

First, the construction of FIG. 1 and the principle of the focus error signal detection according to the knife-edge method will be described. A light beam released from a laser diode 1 passes through a polarizing light beam splitter 2, becomes a parallel light by means of a collimator lens 3, enters an objective lens 6 via a spherical aberration compensator 5 and a quarter wavelength plate 4, and passes through a transparent substrate 8 of an optical disk 7. The light beam is condensed by means of the objective lens 6 on the recording/reproducing surface of the optical disk 7.

The light reflected on the recording/reproducing surface of the optical disk 7, passes through the transparent substrate 8 again, becomes a parallel light by means of the objective lens 6, is condensed by the collimator lens 3 via the quarter wavelength plate 4 and the spherical aberration compensator 5, and enters the polarizing beam splitter 2. The light beam entering the polarizing beam splitter 2 is reflected by the polarizing beam splitter 2 as its plane of polarization is rotated 90° by passing the quarter wavelength plate 4 twice.

The light beam reflected by the polarizing beam splitter 2 is diffracted by a hologram 9, and is irradiated on the light detector 11 via the detection lens 10. The light-receiving unit of the light detector 11 is divided into four sectors, and the incident light is photoelectrically converted on each of these four sectors and produces output signals.

Figure 2:
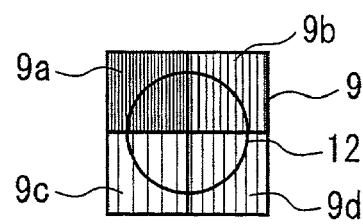
FIG. 2 is a pattern diagram of a hologram element used in the first embodiment of the present invention.
Figure 3:
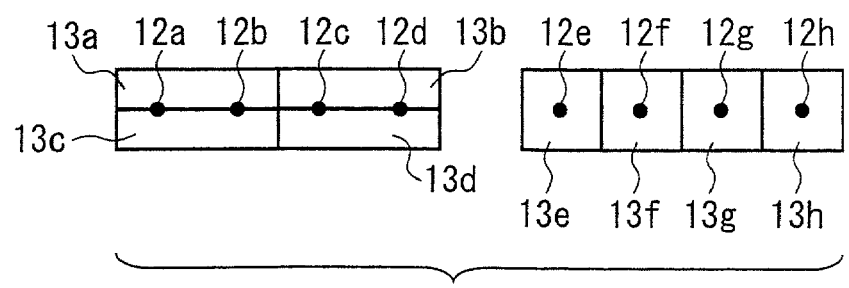
FIG. 3 is a pattern diagram of the light-receiving unit of a light detector used in the first embodiment of the present invention and a diagram showing the shape of the spots formed on the light detector when the optical disk is on the in-focus point.

At this time, the detecting lens 10 and the light detector 11 are located in such a way that the light focuses on the light detector 11 when the recording/reproducing surface of the optical disk 7 is in the focus position of the light beam condensed by the objective lens 6. As shown in FIG. 2, a pattern with a different pitch is formed in each of the four sectors defined in the hologram 9. Consequently, light beams 12 (12a through 12h) diffracted by the hologram 9 are condensed on light-receiving unit patterns 13 (13a through 13b) of the light detector 11 respectively as shown in FIG. 3.

In other words, among the light beams 12 entering the hologram 9, the light of a ±1 order diffracted by the hologram pattern 9a are condensed on the spots 12a and 12h formed on the light-receiving unit pattern 13 of the light detector 11, the light beams of a ±1 order diffracted by the hologram pattern 9b are condensed on the spots 12b and 12g, the light of a ±1 order diffracted by the hologram pattern 9c are condensed on the spots 12c and 12f, and the light of a ±1 order diffracted by the hologram pattern 9d are condensed on the spots 12d and 12e, respectively.

Figure 4:
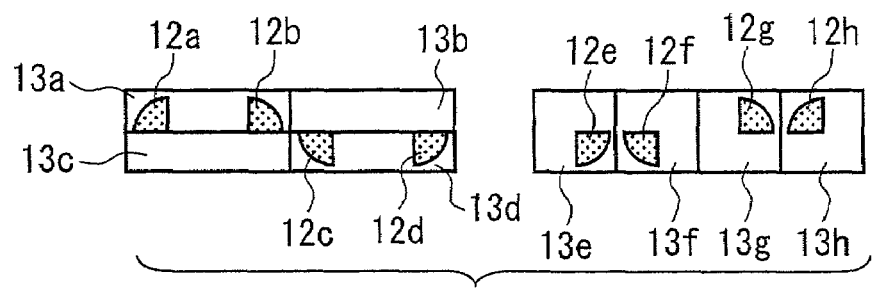
FIG. 4 is a pattern diagram of the light-receiving unit of a light detector used in the first embodiment of the present invention and a diagram showing the shape of the spots formed on the light detector when the optical disk is closer than the in-focus point.
Figure 5:
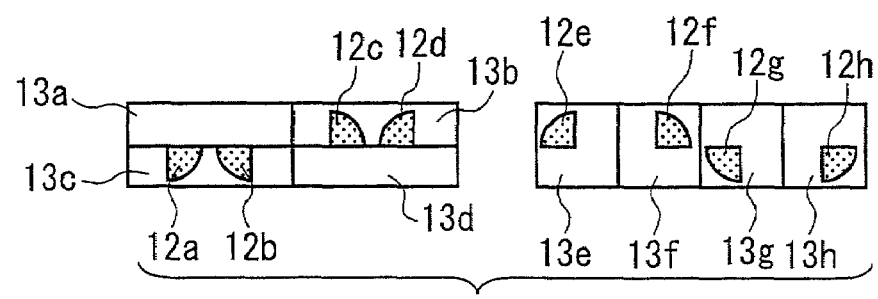
FIG. 5 is a pattern diagram of the light-receiving unit of a light detector used in the first embodiment of the present invention and a diagram showing the shape of the spots formed on the light detector when the optical disk is further than the in-focus point.

Since the light beams is irradiated on the light detector 11 before they converge to focus when the recording/reproducing surface of the optical disk 7 approaches the objective lens 6, they form spots 12a through 12h as shown in FIG. 4. On the contrary, as the recording/reproducing surface of the optical disk 7 moves away from the objective lens 6, the light beams is irradiated on the light detector 11 after they converge to focus before they reach the light detector 11, so that they form spots 12a through 12h as shown in FIG. 5.

Let the output signals from the light-receiving unit patterns 13a, 13b, 13c and 13d of the light detector 11 be named S13a, S13b, S13c and S13d respectively, then the focus error signal FE and the focus sum signal FS can be calculated from the following formulas:

$$FE=(S13a+S13d)-(S13b+S13c) \tag{1}$$

$$FS=S13a+S13b+S13c+S13d \tag{2}$$

The output signals from the light receiving unit patterns 13e through 13h are used for calculating the tracking error signal.

The above is the principle of the general focus error signal detection method, which is otherwise known as the knife-edge method; the present embodiment uses the focus error signal detection system according to the knife-edge method to detect the thickness error of the transparent substrate 8.

The present invention is not only applicable to the focus error signal detection system according to the knife-edge method with the construction described in the abovementioned FIG. 1, but rather to any other focus error signal detection system according to the knife-edge method such as a method where the light beam is split into two and only half of it is used, or the method using a Foucault prism as a means of splitting the beam.

Next, the principle example for detecting the thickness error of the transparent substrate 8 in the optical disk device using the focus error signal detection system according to the knife-edge method will be described. When the recording/reproducing surface of the optical disk 7 is too close to or too far from the focus plane of the objective lens 6, the spots 12a through 12h irradiated on the light receiving unit patterns 13a through 13h of the light detector 11 enlarge as described with reference to FIG.4 and FIG. 5, and eventually expand beyond the boundaries of the light receiving unit patterns 13a through 13h in accordance with the increase in the defocusing amount (focus error amount).

If the thickness of the transparent substrate 8 is not deviating from the specified value, the rate of enlargement of the spots 12a through 12h relative to the absolute value of the defocusing amount is the same for both when the defocusing amount is positive (when the recording/reproducing surface of the optical disk 7 approaches the focus plane of the objective lens 6) or when it is negative (when the recording/reproducing surface moves away from the focus plane of the objective lens 6), and the method in which the spots 12a through 12h expand are symmetrical when the defocusing amount is positive and negative as shown in FIG. 4 and FIG. 5.

Figure 6:
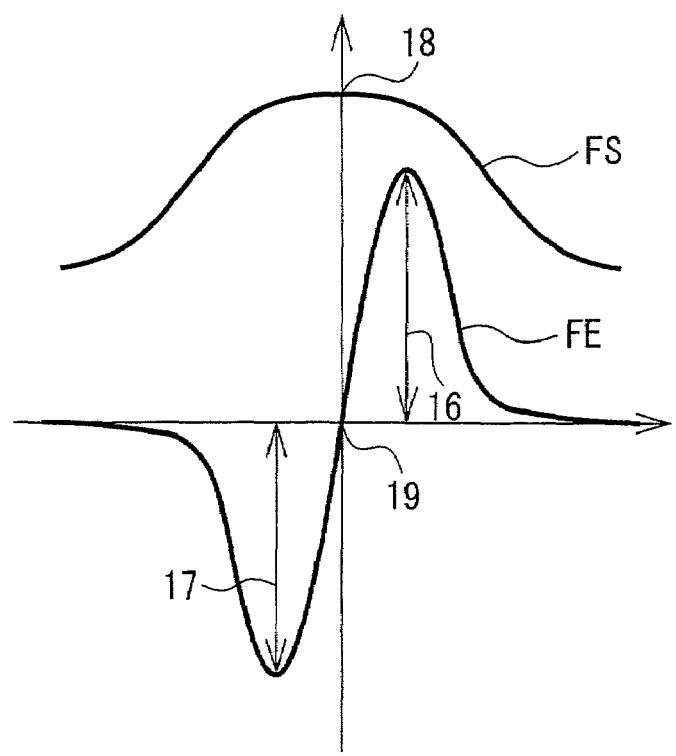
FIG. 6 is a diagram showing the focus error signal and the focus sum signal obtained in the first embodiment of the present invention.

Therefore, by conducting calculations according to the formulas (1) and (2) based on the output signals S13a through S13d of the light receiving patterns 13a through 13d, the focus error signal FE and the focus sum signal FS are obtained as shown in FIG. 6. In FIG. 6, the horizontal axis represents the defocusing amount, and the vertical axis represents the signal intensities of focus error signal FE and the focus sum signal FS.

Since the split line of the hologram 9 and the split line of the light-receiving unit pattern 13 on the light detector 11 are positioned to be parallel with each other, the absolute value 16 of the positive peak (hereinafter called "positive side peak") of the focus error signal FE is equal to the absolute value 17 of the negative peak (hereinafter called "negative side peak") of the focus error signal FE. Moreover, the focus position of the peak point 18 of the focus sum signal FS coincides with the focus position of the zero point 19 of the focus error signal FE.

However, if the thickness of the transparent substrate 8 is deviating from the specified value, a spherical aberration develops relative to the deviation amount. Consequently, the method in which the spots 12a through 12h expand, which is irradiated on the light-receiving unit patterns 13a through 13h of the light detector 11 is unsymmetrical in regard to whether the defocusing amount is positive or negative, and either one of the two with the larger spot-enlarging ratio expand beyond the light-receiving unit pattern 13 faster than the other.

Therefore, the absolute value 16 of the positive side peak of the focus error signal FE becomes different from the absolute value 17 of the negative side peak of the focus error signal FE, and the characteristic curve of the focus error signal FE relative to the defocusing amount becomes an unsymmetrical S-curve.

Now, since the spherical aberration amount varies with the thickness error of the transparent substrate 8, the degree of the unsymmetrical expansion of the spots 12a through 12h irradiated on the light-receiving unit pattern 13a through 13h of the light detector 11 varies with the thickness error, so that the difference between the absolute value 16 of the positive side peak of the focus error signal FE and the absolute value 17 of the negative side peak varies with the thickness error of the transparent substrate 8.

Moreover, since the polarity of the spherical aberration is different depending on whether the thickness of the transparent substrate 8 is thinner or thicker than the specified value, the method in which the unsymmetrical expansions occur on the spots 12a through 12h irradiated on the light-receiving unit patterns 13a through 13h of the light detector 11 are opposite as well. In other words, the size relationship between the absolute value 16 of the positive side peak of the focus error signal FE and the absolute value 17 of the negative side peak reverses depending on whether the thickness of the transparent substrate 8 is thinner or thicker than the specified value. Therefore, by comparing the absolute value 16 of the positive side peak of the focus error signal FE with the absolute value 17 of the negative side peak, the absolute value and the symbol of the thickness error of the transparent substrate 8 can be detected.

When a spherical aberration occurs due to a thickness error of the transparent substrate 8, the spots 12a through 12h themselves irradiated on the light-receiving unit patterns 13a through 13h of the light detector 11 develop distortions, and become blurred images accompanying side lobes even when the recording/reproducing surface of the optical disk 7 is close to the focus plane of the objective lens 6. Consequently, it develops a deviation of focusing positions between the peak point 18 of the focus sum signal FS that detects the light amount of all spots and the zero point 19 of the focus error signal FE.

Now, since the spherical aberration amount varies with the thickness error of the transparent substrate 8, the degree of distortions of the spots 12a through 12h irradiated on the light-receiving unit patterns 13a through 13h of the light detector 11 varies as well, so that the difference between the peak point 18 of the focus sum signal FS and the zero point 19 of the focus error signal FE in the focusing positions also varies with the thickness error of the transparent substrate 8.

Moreover, since the polarity of the spherical aberration is different depending on whether the thickness of the transparent substrate 8 is thinner or thicker than the specified value, the spots 12a through 12h irradiated on the light-receiving unit patterns 13a through 13h of the light detector 11 carry out opposite changes before and after the optical axis. In other words, the focusing position of the peak point 18 of the focus sum signal FS relative to the zero point 19 of the focus error signal FE is reversed depending on whether the thickness of the transparent substrate 8 is thinner or thicker than the specified value. Therefore, by detecting the difference between the peak point 18 of the focus sum signal FS and the zero point 19 of the focus error signal FE in the focusing positions including its symbol, the absolute amount and the symbol of the thickness error of the transparent substrate 8 can be detected.

Figure 7:
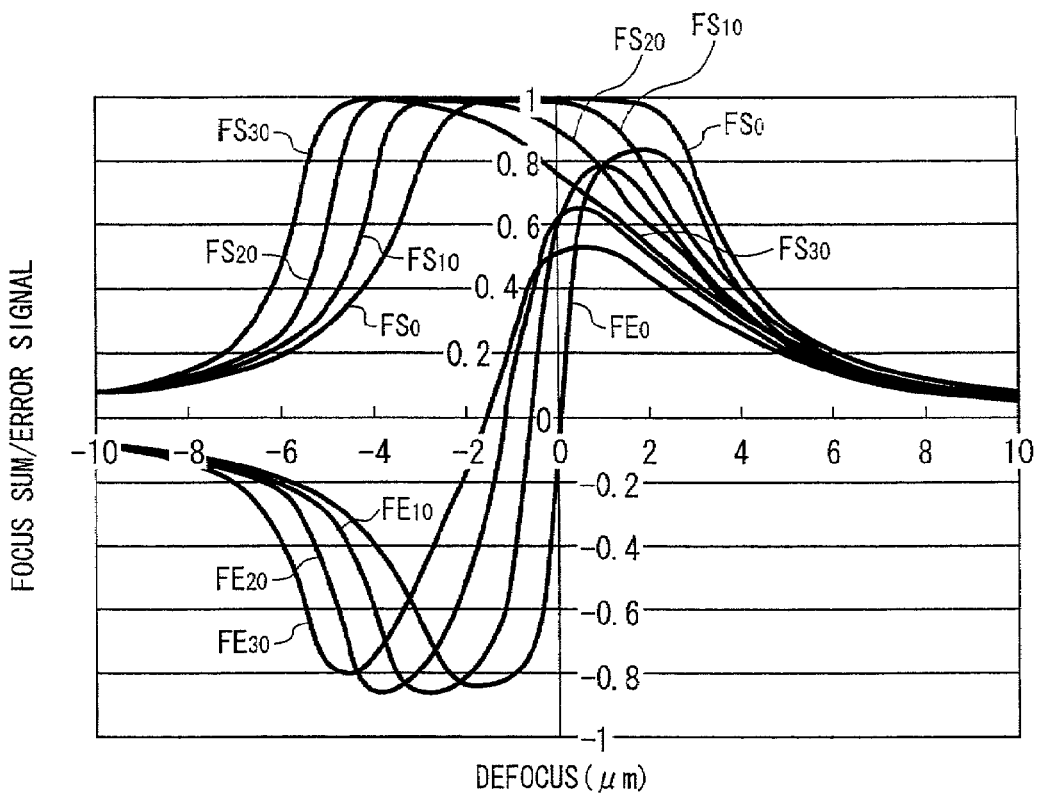
FIG. 7 is a diagram showing a simulation result for the focus error signal and the focus sum signal obtained by using the focus error signal detection system based on the knife-edge method in the first embodiment of the present invention.
Figure 8:
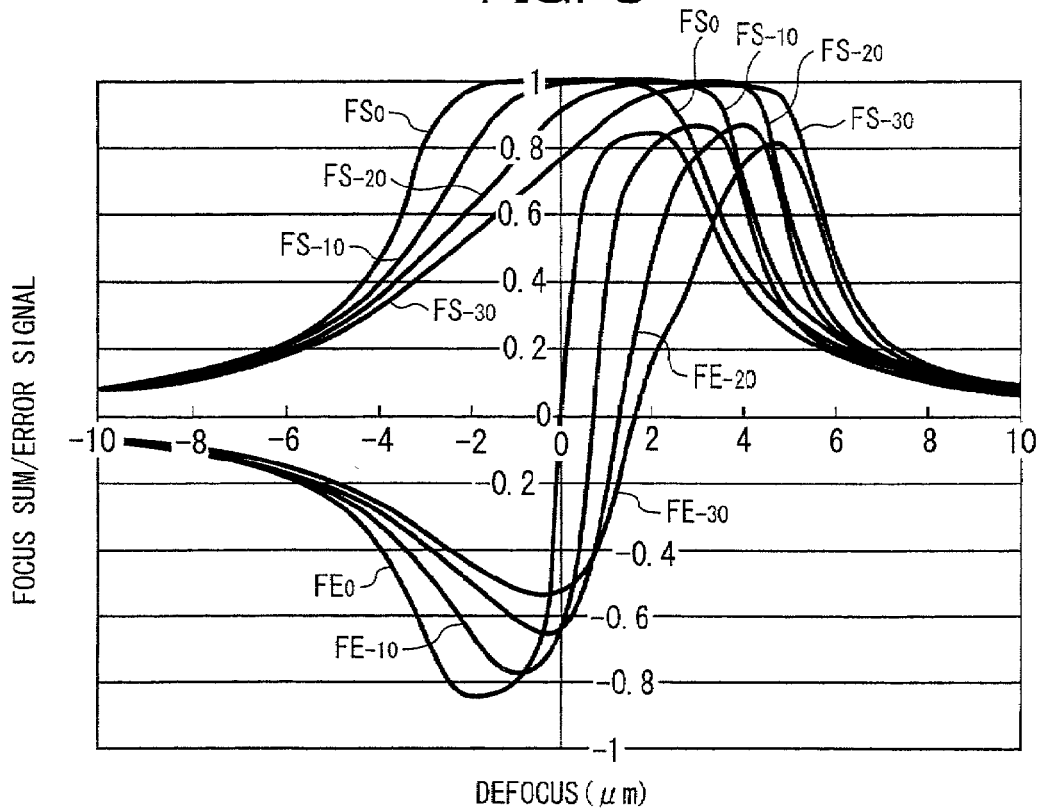
FIG. 8 is a diagram showing a simulation result for the focus error signal and the focus sum signal obtained by using the focus error signal detection system based on the knife-edge method in the first embodiment of the present invention.

FIG. 7 and FIG. 8 are diagrams showing the simulation results of the focus error signal FE and the focus sum signal FS obtained as the thickness error of the transparent substrate 8 is varied in the focus error signal detection system according to the knife-edge method. FIG. 7 shows a case when the thickness of the transparent substrate 8 is thicker than the specified value, and FIG. 8 shows a case when the thickness of the transparent substrate 8 is thinner than the specified value. In FIG. 7 and FIG. 8, the horizontal axis represents the defocusing amount, while the vertical axis represents the signal intensities of the focus error signal FE and the focus sum signal FS.

FE0, FE10, FE20, FE30, FE−10, FE−20, and FE−30 are the focus error signal FE when the thickness error difference of the transparent substrate 8 is 0, 10, 20, 30, −10, −20, and −30 µm respectively. Also, FS0, FS10, FS20, FS30, FS−10, FS−20, and FS−30 are the focus sum signal FS when the thickness error amount of the transparent substrate 8 is 0, 10, 20, 30, −10, −20, and −30 µm respectively.

According to FIG. 7, if the thickness of the transparent substrate 8 is thicker than the specified value, the absolute value of the negative side peak becomes larger than the positive side peak of the focus error signal FE depending on the thickness error amount of the transparent substrate 8 as mentioned before, so that the peak point of the focus sum signal FS moves to the negative side with respect to the zero point of the focus error signal FE.

On the other hand, according to FIG. 8, if the thickness of the transparent substrate 8 is thinner than the specified value, the absolute value of the negative side peak becomes smaller than the absolute value of the positive side peak of the focus error signal FE depending on the thickness error difference of the transparent substrate 8 as mentioned before, so that the peak point of the focus sum signal FS moves to the positive side with respect to the zero point of the focus error signal FE.

Therefore, it is possible to detect the absolute amount of the thickness error of the transparent substrate 8 and its symbol by detecting the difference between the absolute value of the positive side peak and the absolute value of the negative side peak of the focus error signal FE, or the difference between the peak point of the focus sum signal FS and the zero point of the focus error signal FE in the focusing positions.

With the method described above, the signal-processing unit 100 can detect the thickness error of the transparent substrate 8. The control unit 101 outputs control signals to the spherical aberration compensator 5 in order to cancel out the spherical aberration caused by the thickness error detected by the signal-processing unit 100. In accordance with the input control signal (external drive signal), the spherical aberration compensator 5 changes the wave surface within the optical system to cancel out the spherical aberration caused by the thickness error of the transparent substrate 8. Thus, the spherical aberration caused by the thickness error of the transparent substrate 8 can be compensated. As a spherical aberration compensator 5, those using a relay lens system or a liquid crystal element can be used.

Since the optical disk device performs focusing control and tracking control during a recording or reproducing operation, it is impossible to detect and compensate for the thickness error of the transparent substrate 8 in real time during the recording or reproducing operation. Therefore, whenever a new optical disk 7 is installed, the thickness error of the transparent substrate 8 is detected at various radial positions of the optical disk 7 by means of the signal processing unit 100 prior to the recording or reproducing operation, and the compensation factor for spherical aberration is calculated by means of the signal processing unit 100 at various radial positions of the optical disk 7.

During the recording or reproducing operation later, the compensation factor is outputted from the signal-processing unit 100 in response to the radial position for recording or reproducing and a control signal based on the compensation factor is outputted by the control unit 101 to the spherical aberration compensator 5 to compensate for the spherical aberration caused by the thickness error of the transparent substrate 8. Thus, stable, high density recording or reproducing can be achieved.

Figure 9:
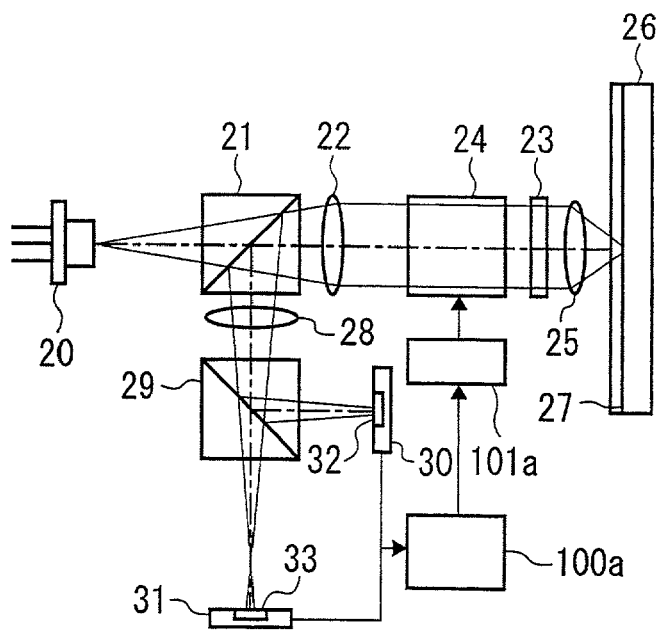
FIG. 9 is a block diagram showing the construction of the optical disk device according to the second embodiment of the present invention.

Next, we will describe the second embodiment of the present invention. FIG. 9 shows an optical disk device of the second embodiment. FIG. 9 shows a general construction of the optical disk device for recording or reproducing information on the optical disk with a recording layer formed on a transparent substrate, in which the focus error signal is obtained by detecting the condensing point deviation of the light beams condensing on the recording or reproducing surface based on the spot size method. Below, the process of detecting the thickness error of the transparent substrate in the optical disk device shown in FIG. 9 using the focus error signal detection system based on the spot size method is explained.

First, the construction shown in FIG. 9 and the principle of the focus error signal detection based on the spot size method is explained. A light beam released from a laser diode 20 passes through a polarizing light beam splitter 21, becomes a parallel light by means of a collimator lens 22, enters an objective lens 25 via a spherical aberration compensator 24 and a quarter wavelength plate 23, and passes through a transparent substrate 27 of an optical disk 26. The light beam then is condensed by means of the objective lens 25 on the recording/reproducing surface of the optical disk 26.

The light beam reflected on the recording/reproducing surface of the optical disk 26, passes through the transparent substrate 27 again, becomes a parallel light by means of the objective lens 25, is condensed by the collimator lens 22 via the quarter wavelength plate 23 and the aspheric aberration compensator 24, and enters the polarizing beam splitter 21.

The light beam entering the polarizing beam splitter 21 will be reflected by the polarizing beam splitter 21 as its plane of polarization is rotated 90° by passing the quarter wavelength plate 23 twice, and 50% of the beams is reflected by a half mirror 29 via a detection lens 28 and radiated on the light detector 30, while the remaining 50% are irradiated on a light detector 31 after passing through a half mirror 29. The light-receiving units of the light detectors 30 and 31 are each divided into three sectors, and the incident light is photoelectrically converted on each of these three sectors to produce output signals.

At this time, the light detector 30 and the light detector 31 are located in such a way that they are equally distanced along the optical axis direction from, ahead and behind of, the focusing position of the light beams condensed by the detection lens 28 when the recording/reproducing surface of the optical disk 26 is at the focusing position of the light beams condensed by the objective lens 25.

Figure 10:
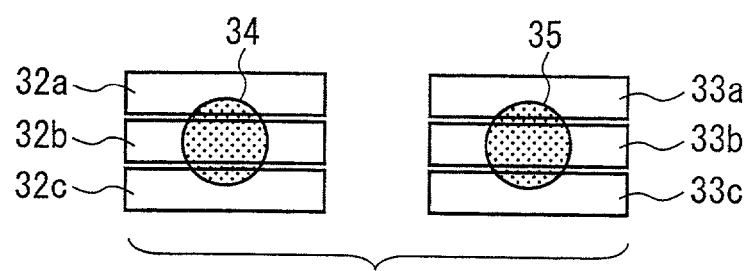
FIG. 10 is a pattern diagram of the light-receiving unit of a light detector used in the second embodiment of the present invention and a diagram showing the shape of the spots formed on the light detector when the optical disk is on the in-focus point.

In other words, the light detector 30 is located a fixed distance closer than the focusing position of said light beam, and the light detector 31 is located a fixed distance further than the focusing position of said light beam. Thus, spots 34 and 35 of the same size are formed on the light-receiving unit pattern 32 (32*a* through 32*c*) of the light detector 30, and the light-receiving unit pattern 33 (33*a* through 33*c*) of the light detector 31, respectively, as shown in FIG. 10.

Figure 11:
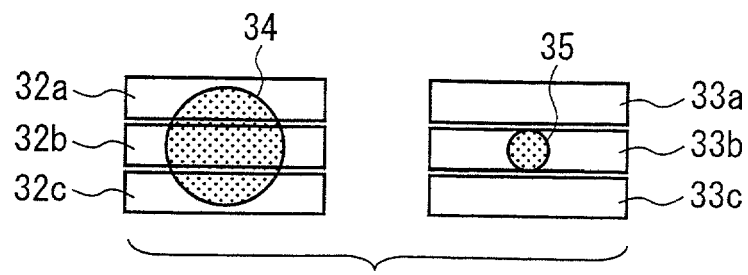
FIG. 11 is a pattern diagram of the light-receiving unit of a light detector used in the second embodiment of the present invention and a diagram showing the shape of the spots formed on the light detector when the optical disk is closer than the in-focus point.

When the recording/reproducing surface of the optical disk 26 approaches the objective lens 25, the focusing positions of the light beams irradiated on the light detectors 30 and 31 move backward, so that the spots 34 formed on the light-receiving units 32*a* through 32*c* of the light detector 30 expand as shown in FIG. 11, while the spots 35 formed on the light-receiving unit patterns 33*a* through 33*c* of the light detector 31 contract as shown in FIG. 11.

Figure 12:
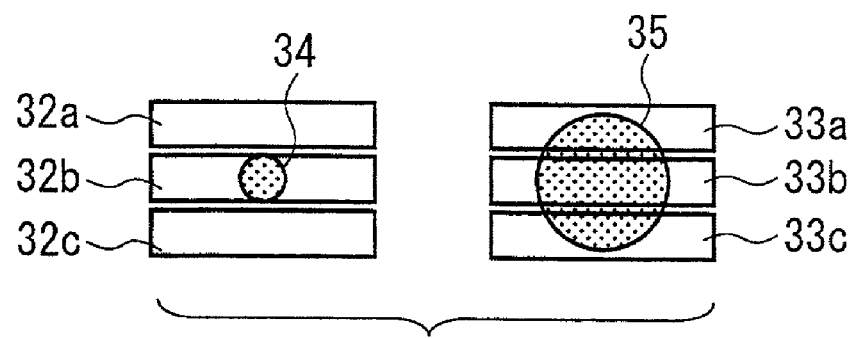
FIG. 12 is a pattern diagram of the light-receiving unit of a light detector used in the second embodiment of the present invention and a diagram showing the shape of the spots formed on the light detector when the optical disk is further than the in-focus point.

On the contrary, when the recording/reproducing surface of the optical disk 26 moves away from the objective lens 25, the focusing positions of the light beams irradiated on the light detectors 30 and 31 move forward, so that the spots 34 formed on the light-receiving unit 32 of the light detector 30 contract, while the spots 35 formed on the light-receiving unit 33 of the light detector 31 expand as shown in FIG. 12.

Consequently, if the output signals from the light-receiving unit patterns 32*a*, 32*b*, 32*c*, 33*a*, 33*b* and 33*c* are named S32*a*, S32*b*, S32*c*, S33*a*, S33*b* and S33*c* respectively, then the focus error signal FE and the focus sum signal FS can be calculated from the following formulas:

$$FE=[(S32a+S32c)-(S32b)]-[(S33a+S33c)-(S33b)] \quad (3)$$

$$FS=S32a+S32b+S32c+S33a+S33b+S33c \quad (4)$$

The above is the principle example of the general focus error signal detection method called the spot size method, and the present embodiment is to detect the thickness error of the transparent substrate 27 using the focus error signal detection system according to the spot size method.

The present invention is not only applicable to the focus error signal detection system according to the spot size method of the construction described with reference to FIG.

9, but also it can be applied to any other focus error signal detection system according to the spot size method such as a method using a hologram with lens power as a means of splitting the beam.

Next, the principle example of detecting the thickness error of the transparent substrate 27 in the optical disk device using the focus error signal detection system according to the spot size method will be described. When the recording/reproducing surface of the optical disk 26 is too close to or too far from the focus plane of the objective lens 25 in the focus error signal detection system according to the spot size method, the spots 34 and 35 irradiated on the light receiving unit patterns 32a through 32c of the light detector 30 and the light receiving unit patterns 33a through 33c of the light detector 31 expand or contract their sizes as described in FIG. 11 and FIG. 12, and eventually expand beyond the boundaries of the light receiving unit patterns 32a through 32c or the light receiving unit patterns 33a through 33c in accordance with increase in the defocusing amount.

If the thickness of the transparent substrate 27 is not deviating from the specified value, the rate of expansion (or contraction) of the spots 34 and 35 relative to the absolute value of the defocusing amount is the same for both when the defocusing amount is positive or when it is negative, and the method in which the spots 34 and 35 expand (contract) are symmetrical when the defocusing amount is positive and negative as shown in FIG. 11 and FIG. 12.

Figure 13:
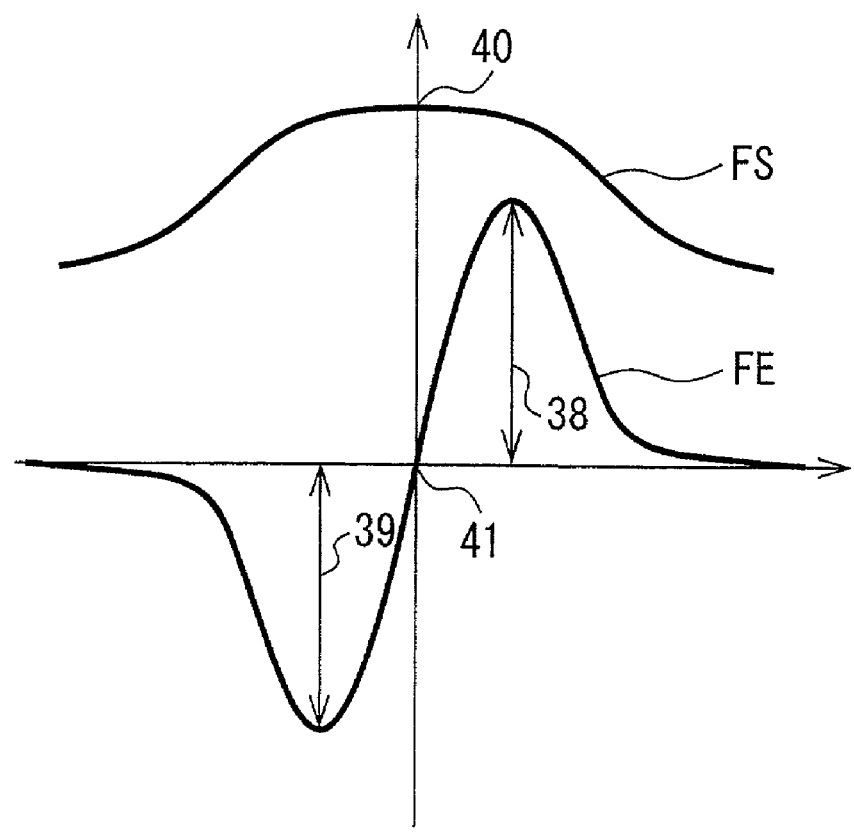
FIG. 13 is a diagram showing the focus error signal and the focus sum signal obtained in the second embodiment of the present invention.

Therefore, by conducting calculations according to the formulas (3) and (4) based on the output signals S32a through S32c of the light receiving patterns 32a through 32c and the output signals S33a through S33c of the light receiving patterns 33a through 33c the focus error signal FE and the focus sum signal FS are obtained as shown in FIG. 13.

Since positioning is such that the light beams irradiated on the light detector 30 form the spot 34 in the center of the light receiving pattern 32 and the light beams irradiated on the light detector 31 form the spot 35 in the center of the light receiving pattern 33, the absolute value 38 of the positive side peak of the focus error signal FE is equal to the absolute value 39 of the negative side peak of the focus error signal FE shown in FIG. 13. Moreover, the focus position of the peak point 40 of the focus sum signal FS coincides with the focus position of the zero point 41 of the focus error signal FE.

However, if the thickness of the transparent substrate 27 is deviating from the specified value, a spherical aberration develops relative to the deviation amount. Consequently, the way the spots 34 and 35 irradiated on the light-receiving unit pattern 32 of the light detector 30 and the light-receiving unit pattern 33 of the light detector 31 expand (contract) is unsymmetrical in regard to whether the defocusing amount is positive or negative, and either one of the two with the larger spot-enlarging ratio expands beyond the light-receiving unit pattern 32 or the light-receiving unit pattern 33 faster than the other. Therefore, the absolute value 38 of the positive side peak of the focus error signal FE becomes different from the positive value 39 of the negative side peak, and the characteristic curve of the focus error signal FE relative to the defocusing amount becomes an unsymmetrical S-curve.

Now, since the spherical aberration amount varies with the thickness error of the transparent substrate 27, the degree of the unsymmetrical expansion (contraction) of the spots 34 and 35 irradiated on the light-receiving unit pattern 32 of the light detector 30 and the light-receiving unit pattern 33 of the light detector 31 varies with the thickness error, so that the difference between the absolute value 38 of the positive side peak of the focus error signal FE and the absolute value 39 of the negative side peak varies with the thickness error of the transparent substrate 27.

Moreover, since the polarity of the spherical aberration is different depending on whether the thickness of the transparent substrate 27 is thinner or thicker than the specified value, the method in which the unsymmetrical expansions (contractions) occur on the spots 34 and 35 irradiated on the light-receiving unit pattern 32 of the light detector 30 and the light-receiving unit pattern 33 of the light detector 31 are opposite as well.

In other words, the size relationship between the absolute value 38 of the positive side peak of the focus error signal FE and the absolute value 39 of the negative side peak reverses depending on whether the thickness of the transparent substrate 27 is thinner or thicker than the specified value. Therefore, by comparing the absolute value 38 of the positive side peak of the focus error signal FE with the absolute value 39 of the negative side peak, the absolute value and the symbol of the thickness error of the transparent substrate 27 can be detected.

When a spherical aberration occurs due to a thickness error of the transparent substrate 27, the spots 34 and 35 themselves irradiated on the light-receiving unit pattern 32 of the light detector 30 and the light-receiving unit pattern 33 of the light detector 31 develop distortions, and become blurred images accompanying side lobes even when the recording/reproducing surface of the optical disk 26 is close to the focus plane of the objective lens 25. Consequently, it develops a deviation of focusing positions between the peak point 40 of the focus sum signal FS that detects the amount of light of all spots and the zero point 41 of the focus error signal FE.

Now, since the spherical aberration-amount varies with the thickness error amount of the transparent substrate 27, the degree of distortions of the spots 34 and 35 irradiated on the light-receiving unit pattern 32 of the light detector 30 and the light-receiving unit pattern 33 of the light detector 31 varies accordingly, so that the difference between the peak point 40 of the focus sum signal FS and the zero point 41 of the focus error signal FE in the focusing positions also varies with the thickness error of the transparent substrate 27.

Moreover, since the polarity of the spherical aberration is different depending on whether the thickness of the transparent substrate 27 is thinner or thicker than the specified value, the spots 34 and 35 irradiated on the light-receiving unit pattern 32 of the light detector 30 and the light-receiving unit pattern 33 of the light detector 31 make opposite changes before and after the optical axis.

In other words, the focusing position of the peak point 40 of the focus sum signal FS relative to the zero point 41 of the focus error signal FE is reversed depending on whether the thickness of the transparent substrate 27 is thinner or thicker than the specified value. Therefore, by detecting the difference in the focusing positions including its symbol between the peak point 40 of the focus sum signal FS and the zero point 41 of the focus error signal FE, the absolute amount and the symbol of the thickness error of the transparent substrate 27 can be detected.

Figure 14:
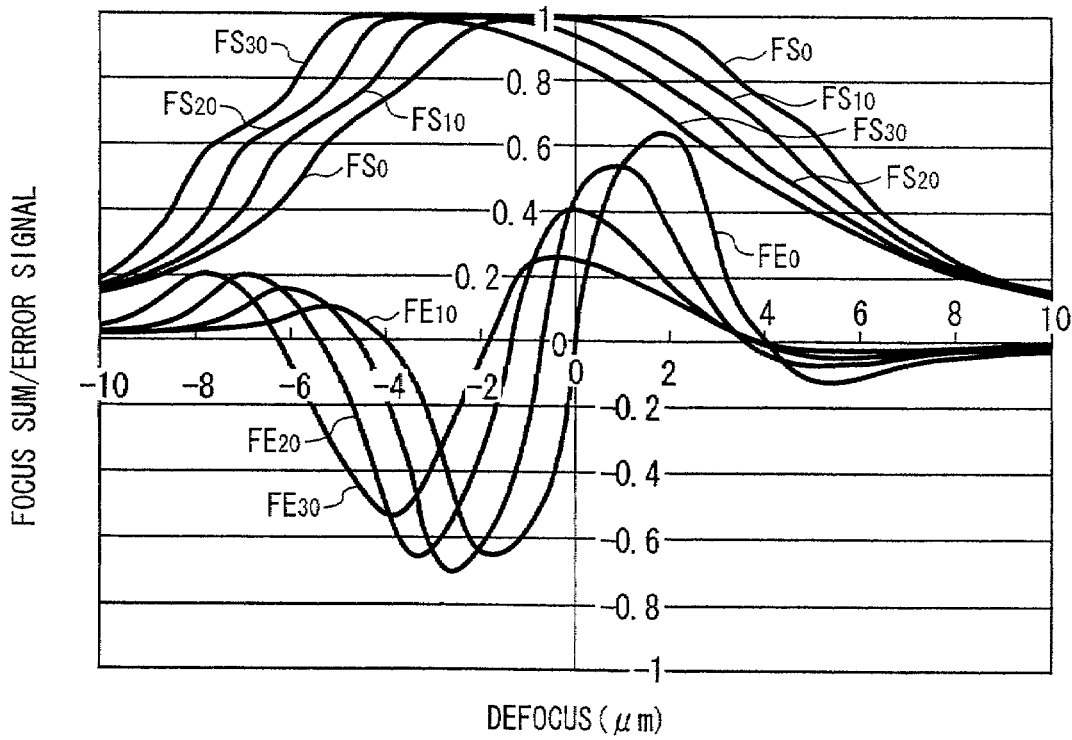
FIG. 14 is a diagram showing a simulation result for the focus error signal and the focus sum signal obtained by using the focus error signal detection system based on the spot size method in the second embodiment of the present invention.
Figure 15:
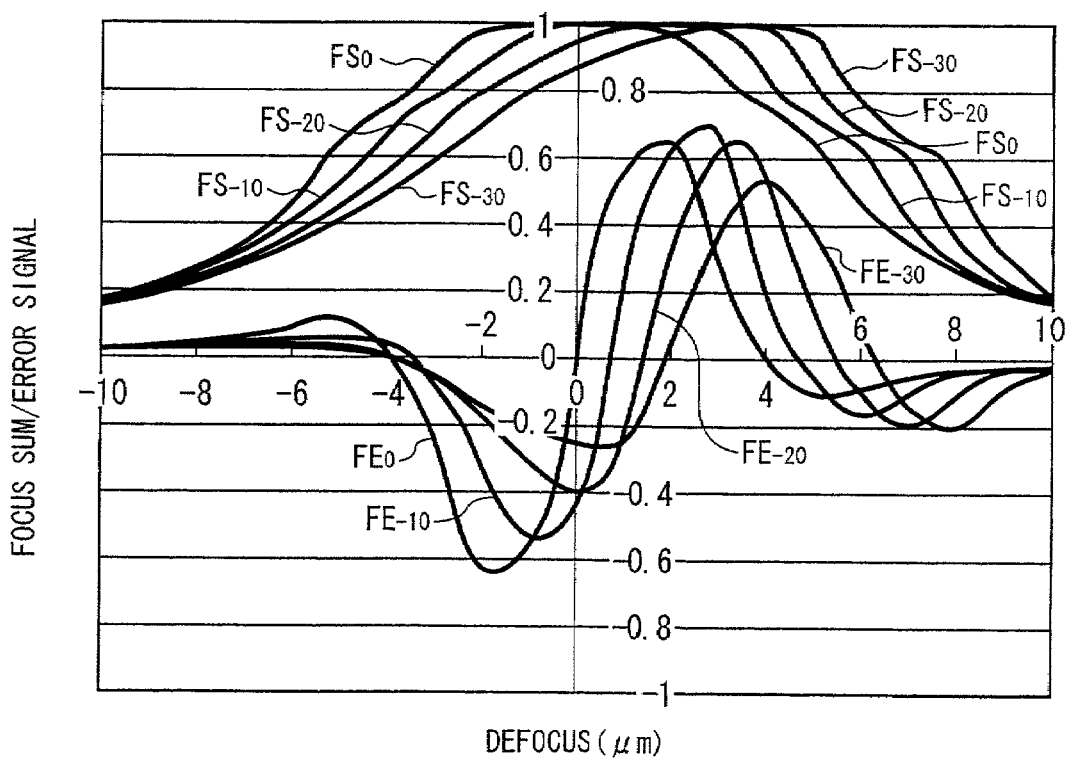
FIG. 15 is a diagram showing a simulation result for the focus error signal and the focus sum signal obtained by using the focus error signal detection system based on the spot size method in the second embodiment of the present invention.

FIG. 14 and FIG. 15 are diagrams showing the simulation results of the focus error signal FE and the focus sum signal FS obtained as the thickness error of the transparent substrate 27 is varied in the focus error signal detection system according to the spot size method. FIG. 14 shows a case when the thickness of the transparent substrate 27 is thicker than the specified value, and FIG. 15 shows a case when the thickness of the transparent substrate 27 is thinner than the specified value.

According to FIG. 14, if the thickness of the transparent substrate 27 is thicker than the specified value, the absolute value of the negative side peak becomes larger than the positive side peak of the focus error signal FE depending on the thickness error amount of the transparent substrate 27 as mentioned before, so that the peak point of the focus sum signal FS moves to the negative side with respect to the zero point of the focus error signal FE.

On the other hand, according to FIG. 15, if the thickness of the transparent substrate 27 is thinner than the specified value, the absolute value of the negative side peak becomes smaller than the absolute value of the positive side peak of the focus error signal FE depending on the thickness error difference of the transparent substrate 27 as mentioned before, so that the peak point of the focus sum signal FS moves to the positive side with respect to the zero point of the focus error signal FE.

Therefore, it is possible to detect the absolute value of the thickness error of the transparent substrate 27 and its symbol by detecting the difference between the absolute value of the positive side peak and the absolute value of the negative side peak of the focus error signal FE, or the difference between the peak point of the focus sum signal FS and the zero point of the focus error signal FE in the focusing positions.

With the method described above, the signal-processing unit 100a can detect the thickness error amount of the transparent substrate 27. The control unit 101a outputs control signals to the spherical aberration compensator 24 in order to cancel out the spherical aberration caused by the thickness error detected by the signal-processing unit 100a. In accordance with the control signal, the spherical aberration compensator 24 changes the wave surface within the optical system to cancel out the spherical aberration caused by the thickness error of the transparent substrate 27.

In order to compensate for the spherical aberration, the thickness error of the transparent substrate 27 needs to be detected at various radial positions of the optical disk 26 by means of the signal processing unit 100a prior to the recording or reproducing operation as in the first embodiment, and the compensation factor for spherical aberration needs to be calculated at various radial positions of the optical disk 26 by the signal processing unit 100a.

Furthermore, during the recording or reproducing operation, the compensation factor is outputted from the signal-processing unit 100a in response to the radial position for recording or reproducing and a control signal based on the compensation factor is outputted by the control unit 100a to the spherical aberration compensator 24 to compensate for the spherical aberration caused by the thickness error. Thus, stable, high density recording or reproducing can be achieved.

Figure 16:
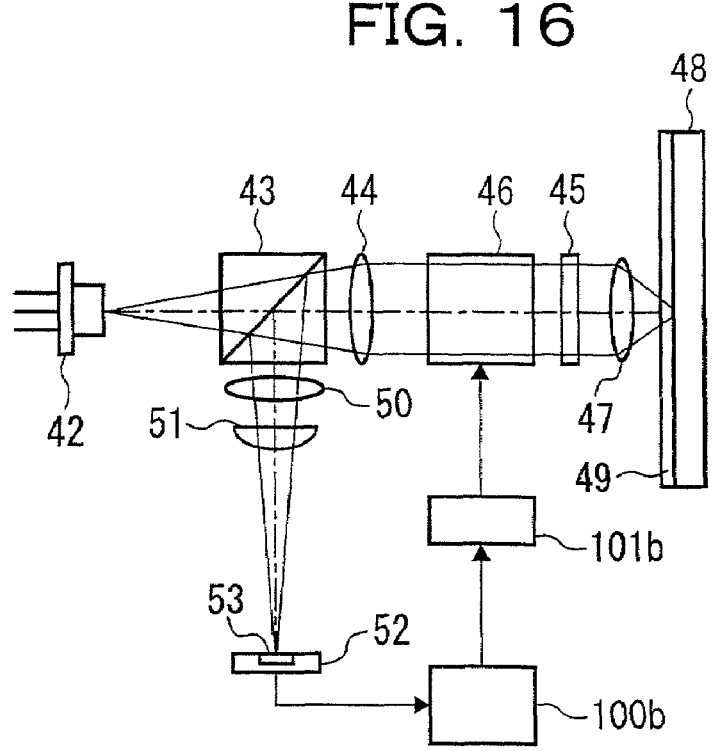
FIG. 16 is a block diagram showing the construction of the optical disk device according to the third embodiment of the present invention.

Next, we will describe the optical disk according to the third embodiment of the present invention with reference to FIG. 16. FIG. 16 shows a general construction of the optical disk device for recording or reproducing information on the optical disk with a recording layer formed on a transparent substrate, in which the focus error signal is obtained by detecting the condensing point deviation of the light beams condensing on the recording or reproducing surface based on the astigmatism method. We will discuss below the principle of the process of detecting the thickness error of the transparent substrate in the optical disk device shown in FIG. 16 using the focus error signal detection system based on the astigmatism method.

First, the construction shown in FIG. 16 and the principle of the focus error signal detection based on the astigmatism method are explained. A light beam released from a laser diode 42 passes through a polarizing light beam splitter 43, becomes a parallel light by means of a collimator lens 44, enters an objective lens 47 via a spherical aberration compensator 46 and a quarter wavelength plate 45, and passes through a transparent substrate 49 of an optical disk 48. The light beam then is condensed by means of the objective lens 47 on the recording/reproducing surface of the optical disk 48.

The light beam reflected on the recording/reproducing surface of the optical disk 48, passes through the transparent substrate 49 again, becomes a parallel light by means of the objective lens 47, is condensed by the collimator lens 44 via the quarter wavelength plate 45 and the spherical aberration compensator 46, and enters the polarizing beam splitter 43.

The light beam entering the polarizing beam splitter 43 is reflected by the polarizing beam splitter 43 as its plane of polarization is rotated 90° by passing the quarter wavelength plate 45 twice, and radiates on a light detector 52 via a detection lens 50 and a cylindrical lens 51, which functions as the astigmatism generating means. The light-receiving unit of the light detector 52 is divided into four sectors, and the incident light is photoelectrically converted on each of these four sectors to produce output signals.

At this time, the generatrix (the direction that does not have lens power) of the cylindrical lens 51, which is the astigmatism generating means, is arranged so as to make an angle of 45° against the split line of the light receiving unit pattern 53 (53a through 53d), which is formed on the light detector 52 and divided into four sectors, and the light detector 52 is positioned in such a way that it will be at the circle of least confusion due to astigmatism generated by the cylindrical lens 51, when the recording/reproducing surface of the optical disk 48 is at the focus position of the light beam condensed by the objective lens 47.

Figure 17:
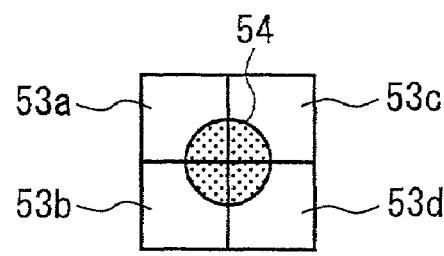
FIG. 17 is a pattern diagram of the light-receiving unit of a light detector used in the third embodiment of the present invention and a diagram showing the shape of the spots formed on the light detector when the optical disk is on the in-focus point.
Figure 18:
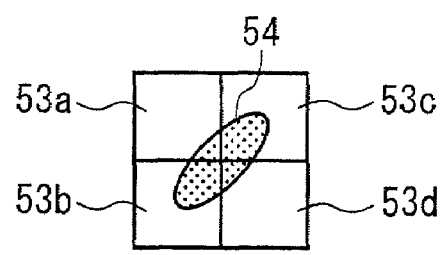
FIG. 18 is a pattern diagram of the light-receiving unit of a light detector used in the third embodiment of the present invention and a diagram showing the shape of the spots formed on the light detector when the optical disk is closer than the in-focus point.
Figure 19:
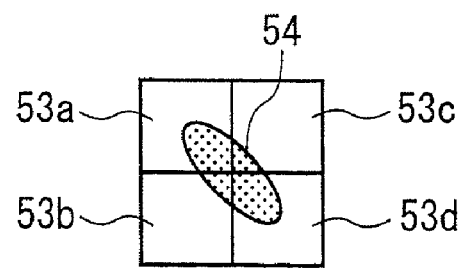
FIG. 19 is a pattern diagram of the light-receiving unit of a light detector used in the third embodiment of the present invention and a diagram showing the shape of the spots formed on the light detector when the optical disk is further than the in-focus point.

Consequently, when the recording/reproducing surface of the optical disk 48 is located at the focusing position of the light beam condensed by the objective lens 47, the shape of the beam spot 54 formed on the light receiving pattern 53 of the light detector 52 becomes a circular shape as shown in FIG. 17; however, it becomes an elliptical shape, as the recording/reproducing surface of the optical disk 48 approaches the objective lens 47, and it becomes an elliptical shape that crosses perpendicularly the elliptical shape shown in FIG. 18 as the recording/reproducing surface of the optical disk 48 moves away from the objective lens 47 (FIG. 19).

Consequently, if the output signals from the light-receiving unit patterns 53a, 53b, 53c and 53d are named S53a, S53b, S53c and S53d respectively, then the focus error signal FE and the focus sum signal FS can be calculated from the following formulas:

$$FE=(S53a+S53d)-(S53b+S53c) \quad (5)$$

$$FS=S53a+S53b+S53c+S53d \quad (6)$$

The above is the principle example of the general focus error signal detection method called the astigmatism method, and the present embodiment is to detect the thickness error of the transparent substrate 49 using the focus error signal detection system according to the astigmatism method. The present invention is not only applicable to the focus error signal detection system according to the astigmatism method of the construction described with reference to FIG. 16, but also it can be applied to any other focus error signal detection system according to the stigmatism method such as a method using a flat parallel plate tilted against the optical axis direction as a means of generating astigmatism.

Next, the principle example of detecting the thickness error of the transparent substrate 49 in the optical disk device using the focus error signal detection system according to the astigmatism method is described. When the recording/reproducing surface of the optical disk 48 is too close to or too far from the focus plane of the objective lens 47 in the focus error signal detection system according to the astigmatism method, the spots 54 irradiated on the light receiving unit patterns 53*a* through 53*d* of the light detector 52 expand into elliptical shapes as described with reference to FIG. 18 and FIG. 19, and eventually expand beyond the boundaries of the light receiving unit patterns 53*a* through 53*d* in accordance with an increase in the defocusing amount.

Figure 20:
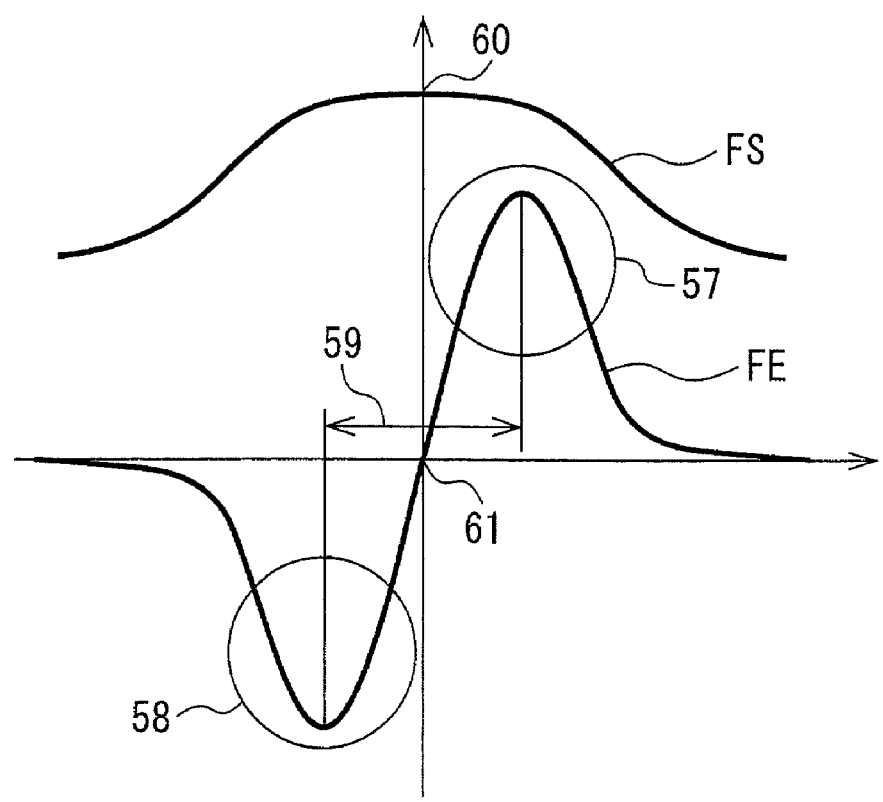
FIG. 20 is a diagram showing the focus error signal and the focus sum signal obtained in the third embodiment of the present invention.

If the thickness of the transparent substrate 49 is not deviating from the specified value, the rate of expansion of the spots 54 relative to the absolute value of the defocusing amount is the same for both when the defocusing amount is positive or when it is negative, and the method in which the spots 54 expand are symmetrical when the defocusing amount is positive and negative as shown in FIG. 18 and FIG. 19. Therefore, by conducting calculations according to the formulas (5) and (6) based on the output signals S53*a* through S53*d* of the light receiving patterns 53*a* through 53*d*, the focus error signal FE and the focus sum signal FS are obtained as shown in FIG. 20.

At this time, the shape of the focus error signal FE in the vicinity 57 of the positive side peak is substantially equal to the shape in the vicinity 58 of the negative side peak, and the characteristic curve of the focus error signal FE relative to the defocusing amount becomes a symmetrical S-curve. Also, the focusing positions of the peak point 60 of the focus sum signal FS and the zero point 61 of the focus error signal FE match each other.

However, if the thickness of the transparent substrate 49 is deviating from the specified value, a spherical aberration occurs in response to the deviation. Therefore, the spot 54 that is irradiated on the light receiving pattern 53 of the light detector 52 enlarges in an unsymmetrical manner in regard to whether the defocusing amount is positive or negative, with one of them having a light distribution in a shape where an end of the short axis or the long axis of an elliptical shape is expanding.

Therefore, the characteristic curve of the focus error signal FE becomes an unsymmetrical S-curve, where the shape of the vicinity 57 of the positive side peak of the focus error signal FE is different from the shape of the vicinity 58 of the negative side peak. Either the vicinity 57 of the positive side peak or the vicinity 58 of the negative side peak has a dulled shape.

Now, since the spherical aberration amount varies with the thickness error of the transparent substrate 49, the degree of the unsymmetrical, elliptical expansion of the spot 54 irradiated on the light-receiving unit pattern 53 of the light detector 52 varies with the thickness error as well, so that the focus pull-in range 59, which is the distance between the positive side peak and the negative side of the focus error signal FE, varies with the thickness error of the transparent substrate 49.

Moreover, since the polarity of the spherical aberration varies depending on whether the thickness of the transparent substrate 49 is thinner or thicker than the specified value, the way the unsymmetrical expansion occurs on the spot 54 irradiated on the light-receiving unit pattern 53 of the light detector 52 becomes opposite as well. In other words, the choice of which of the peaks, either the positive side peak or the negative side peak of the focus error signal FE, becomes dull reverses depending on whether the thickness of the transparent substrate 49 is thinner or thicker than the specified value. Therefore, the absolute value and the symbol of the thickness error of the transparent substrate 49 can be detected from the shape comparison of the waveform in the vicinity 57 of the positive side peak and the waveform in the vicinity 58 of the negative side peak of the focus error signal FE, and the absolute value of the focus pull-in range 59.

Moreover, when spherical aberration occurs due to the thickness error of the transparent substrate 49, the spots 54 irradiated on the light-receiving patterns 53 of the light detector 42 become distorted, and generate blurred images accompanied with side lobes even if the recording/reproducing surface of the optical disk 48 is close to the focus surface of the objective lens 47. Therefore, a discrepancy develops in the focusing positions of the peak point 60 of the focus sum signal FS that detects the light quantity of all the spots and the zero point 61 of the focus error signal FE that shows the in-focus condition.

Now, since the spherical aberration amount varies with the thickness error of the transparent substrate 49, the degree of distortions of the spot 54 irradiated on the light-receiving unit pattern 53 of the light detector 52 varies as well, so that the difference in the focusing positions between the peak point 60 of the focus sum signal FS and the zero point 61 of the focus error signal FE varies as well with the thickness error of the transparent substrate 49.

Moreover, since the polarity of the spherical aberration is different depending on whether the thickness of the transparent substrate 49 is thinner or thicker than the specified value, the spot 54 irradiated on the light-receiving unit pattern 53 of the light detector 52 makes opposite changes before and after the optical axis. In other words, the focusing position of the peak point 60 of the focus sum signal FS relative to the zero point 61 of the focus error signal FE is reversed depending on whether the thickness of the transparent substrate 49 is thinner or thicker than the specified value. Therefore, by detecting the difference in the focusing positions including its symbol between the peak point 60 of the focus sum signal FS and the zero point 61 of the focus error signal FE, the absolute amount and the symbol of the thickness error of the transparent substrate 49 can be detected.

Figure 21:
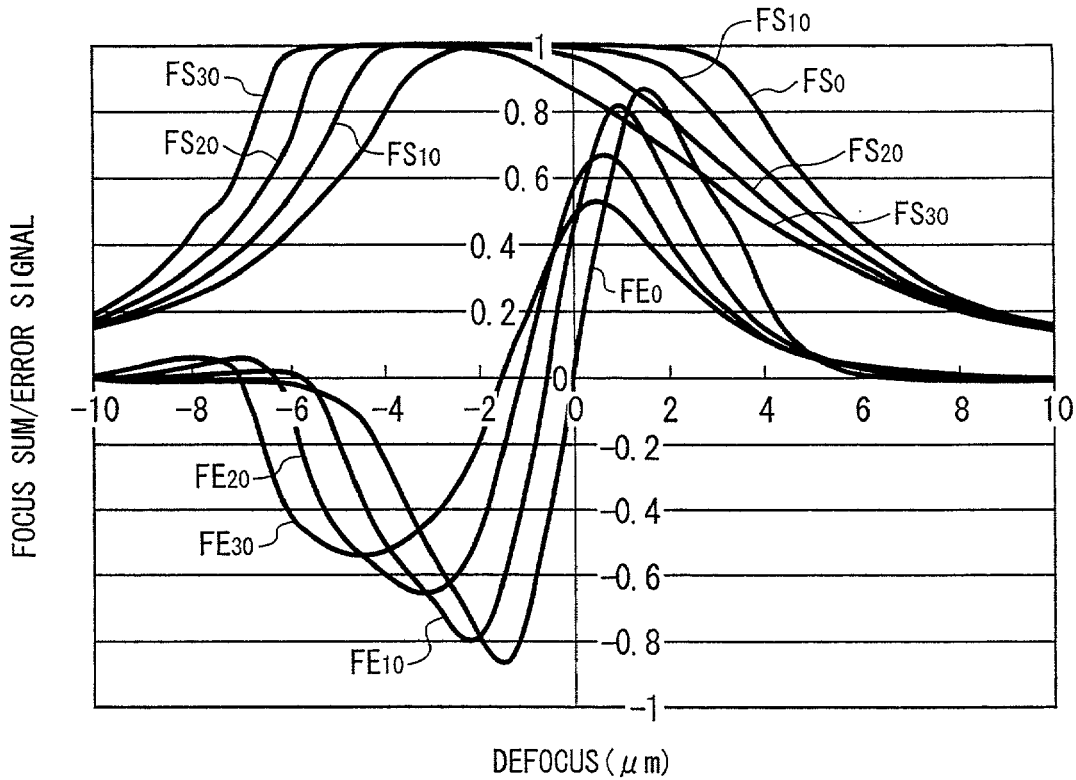
FIG. 21 is a diagram showing a simulation result for the focus error signal and the focus sum signal obtained by using the focus error signal detection system based on the astigmatism method in the third embodiment of the present invention.
Figure 22:
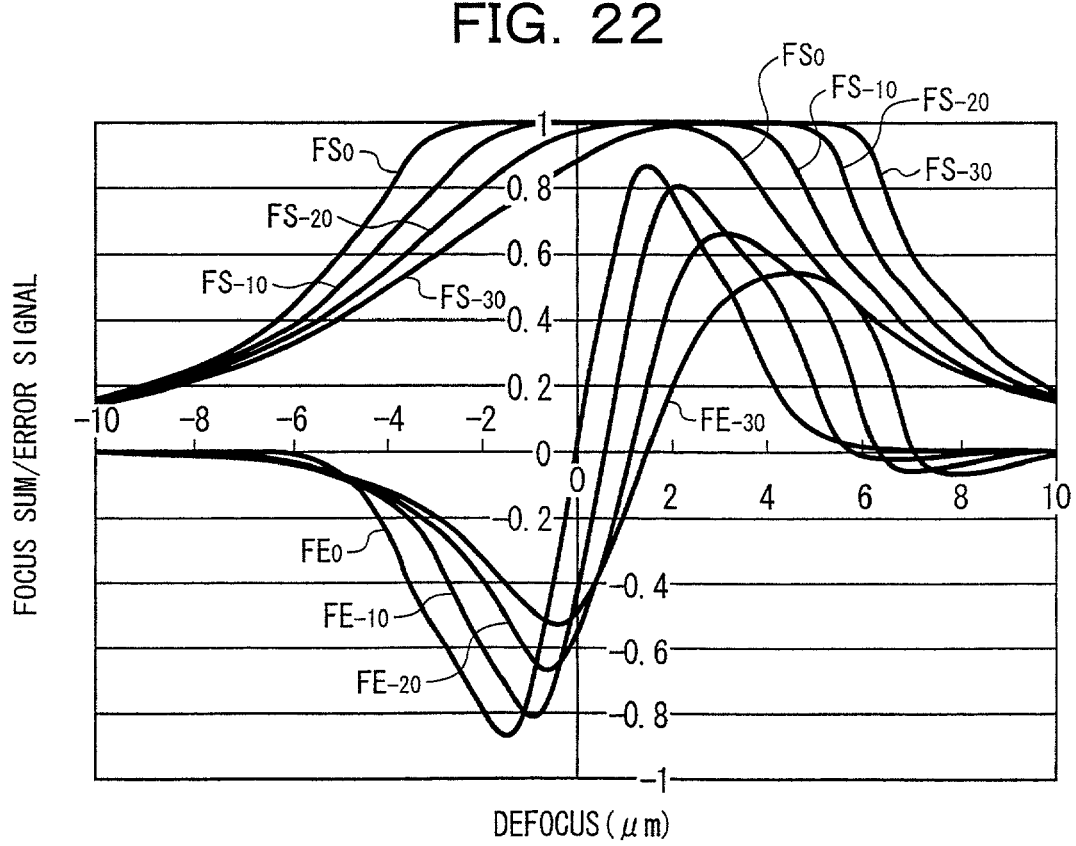
FIG. 22 is a diagram showing a simulation result for the focus error signal and the focus sum signal obtained by using the focus error signal detection system based on the astigmatism method in the third embodiment of the present invention.

FIG. 21 and FIG. 22 are diagrams showing the simulation results of the focus error signal FE and the focus sum signal FS obtained as the thickness error of the transparent substrate 49 is varied in the focus error signal detection system according to the astigmatism method. FIG. 21 shows a case when the thickness of the transparent substrate 49 is thicker than the specified value, and FIG. 22 shows a case when the thickness of the transparent substrate 49 is thinner than the specified value.

According to FIG. 21, if the thickness of the transparent substrate 49 is thicker than the specified value, the waveform in the vicinity of the negative side peak becomes a duller shape compared to the waveform in the vicinity of the positive side peak of the focus error signal FE as described above, so that the focus pull-in range increases with the thickness error of the transparent substrate 49. Also, the peak point of the focus sum signal FS deviates in relation to the zero point of the focus error signal FE.

According to FIG. 22, if the thickness of the transparent substrate 49 is thinner than the specified value, the waveform in the vicinity of the positive side peak becomes a duller shape compared to the waveform in the vicinity of the negative side peak of the focus error signal FE, and the focal pull-in range increases with the thickness error of the transparent substrate 49 as described above. Moreover, the peak point of the focus sum signal FS moves to the positive side with reference to the zero point of the focus error signal FE.

Therefore, it is possible to detect the signal of the thickness error of the transparent substrate 49 and its symbol by detecting the absolute amount of the focus pull-in range and comparing the waveform in the vicinity of the positive side peak and the waveform in the vicinity of the negative side peak of the focus error signal, or by detecting the difference between the peak point of the focus sum signal and the zero point of the focus error signal in their focus positions.

With the method described above, the signal-processing unit 100b can detect the thickness error of the transparent substrate 49. In order to compensate for spherical aberration, it is necessary to detect the thickness errors of the transparent substrate 49 by the signal processing unit 100b at various radial positions of the optical disk 48 prior to the recording or reproducing operation, and calculate the compensation factor for the spherical aberration for each radial position of the optical disk 48 by the signal processing unit 100b as in the first embodiment.

During the recording or reproducing operation, the compensation factor is outputted from the signal-processing unit 100b in response to the radial position for recording or reproducing and a control signal based on the compensation factor is outputted by the control unit 101b to the spherical aberration compensator 46 to compensate for the spherical aberration caused by the thickness error of the transparent substrate 49. Thus, stable, high density recording or reproducing can be achieved.

What is claimed is:

1. An optical disk device for recording or reproducing information on an optical disk with a recording layer formed on a transparent substrate, comprising:
    an objective lens for condensing light for recording or reproducing information on said recording layer via a transparent substrate of the optical disk;
    a signal detector for detecting a focus error signal from all rays of return light reflecting from said recording layer;
    a thickness error detector for detecting a thickness error of said transparent substrate with reference to a specified value or its sign, based on a difference between the absolute value of the positive peak of said focus error signal and the absolute value of the negative peak of said focus error signal;
    a spherical aberration compensator for compensating for spherical aberration caused by the thickness error of said transparent substrate; and
    a controller for calculating a compensating amount for said spherical aberration at each radial position of said optical disk based on a thickness error of said transparent substrate detected at said radial position of said optical disk prior to recording or reproducing information, and driving said spherical aberration compensator to compensate for said spherical aberration based on said compensation amount during recording or reproduction of said optical disk.

2. An optical disk device for recording or reproducing information on an optical disk with a recording layer formed on a transparent substrate, comprising:
    an objective lens for condensing light for recording or reproducing information on said recording layer via a transparent substrate of the optical disk;
    a signal detector for detecting a focus error signal and a sum signal from all rays of return light reflecting from said recording layer;
    a thickness error detector for detecting a thickness error of said transparent substrate with reference to a specified value or its sign, based on a difference between the focus position of the peak point of said sum signal and the focus error signal;
    a spherical aberration compensator for compensating for spherical aberration caused by the thickness error of said transparent substrate; and
    a controller for calculating a compensating amount for said spherical aberration at each radial position of said optical disk based on a thickness error of said transparent substrate detected at said radial position of said optical disk prior to recording or reproducing information, and driving said spherical aberration compensator to compensate for said spherical aberration based on said compensation amount during recording or reproduction of said optical disk.

3. An optical disk device for recording or reproducing information on an optical disk with a recording layer formed on a transparent layer, comprising:
    an objective lens for condensing light for recording or reproducing information on said recording layer via a transparent substrate of the optical disk;
    a signal detector for detecting a focus error signal and a focus sum signal from return light reflecting from said recording layer;
    a thickness error detector for detecting a thickness error of said transparent substrate with reference to a specified value, based on the characteristics of said focus error signal;
    a spherical aberration compensator for compensating for spherical aberration caused by the thickness error of said transparent substrate placed on an optical path of said signal detector; and
    a controller for calculating a compensating amount for said spherical aberration at each radial position of said optical disk based on a thickness error of said transparent substrate detected at said radial position of said optical disk prior to recording or reproducing information, and driving said spherical aberration compensator to compensate for said spherical aberration based on said compensation amount during recording or reproduction of said optical disk.

4. The optical disk device described in claim 3, wherein
    said signal detector detects said focus error signals and said focus sum signals by means of the spot size method; and
    said thickness error detector detects the thickness error of said transparent substrate or its symbol based on differences in the absolute value between the positive peak and negative peak of said focus error signals.

5. The optical disk device described in claim 3, wherein
    said signal detector detects said focus error signals and said focus sum signals by means of the astigmatism method; and
    said thickness error detector detects the thickness error of said transparent substrate based on focus pull-in range which is the distance between the positive peak and negative peak of said focus error signals.

6. The optical disk device described in claim 5, wherein
    said thickness error detector detects the thickness error symbols of said transparent substrate and its symbol by means of detecting absolute amount of the thickness error of said transparent substrate from said focus pull-in range and compares waveforms of the positive peak vicinity with waveforms of the negative peak vicinity of said focus error signals.

7. An optical disk device for recording or reproducing information on an optical disk with a recording layer formed on a transparent substrate, comprising:
- an objective lens for condensing light for recording or reproducing information on said recording layer via a transparent substrate of the optical disk;
- a signal detector for detecting a focus error signal and a focus sum signal from return light reflecting from said recording layer; and
- a thickness error detector for detecting a thickness error of said transparent substrate with reference to a specified value, based on the peak position of said focus sum signal;
- a spherical aberration compensator for compensating for spherical aberration caused by the thickness error of said transparent substrate placed on an optical path of said signal detector; and
- a controller for calculating a compensating amount for said spherical aberration at each radial position of said optical disk based on a thickness error of said transparent substrate detected at said radial position on the optical disk prior to recording or reproducing information, and driving said spherical aberration compensator to compensate for said spherical aberration based on said compensation amount during recording or reproduction of said optical disk.

8. The optical disk device described in claim 7, wherein
said signal detector detects said focus error signals and said focus sum signals by means of the spot size method; and
said thickness error detector detects the thickness error of said transparent substrate or its symbol based on differences between the peak point of said focus sum signal and the zero point of said focus error signal in their focus positions.

9. The optical disk device described in claim 7, wherein
said signal detector detects said focus error signals and said focus sum signals by means of the astigmatism method; and
said thickness error detector detects the thickness error of said transparent substrate and its symbol based on differences between the peak point of said focus sum signal and the zero point of said focus error signal.

* * * * *